(12) United States Patent
Zarzecki et al.

(10) Patent No.: US 6,431,815 B1
(45) Date of Patent: Aug. 13, 2002

(54) FOLDABLE RETRACTABLE LOADING RAMP ASSEMBLY

(75) Inventors: James Zarzecki, Bethlehem; Charles McMenamy, Springtown; Richard Roberts, Bethlehem, all of PA (US)

(73) Assignee: Bustin Industrial Products, Inc., East Stroudsburg, PA (US)

( * ) Notice: Subject to any disclaimer, the term of this patent is extended or adjusted under 35 U.S.C. 154(b) by 0 days.

(21) Appl. No.: 09/667,271

(22) Filed: Sep. 22, 2000

(51) Int. Cl.[7] .................................................. B60P 1/00
(52) U.S. Cl. ..................... 414/537; 414/538; 414/552; 14/69.5
(58) Field of Search ................................ 414/537, 538, 414/552, 921, 522, 69.5

(56) References Cited

U.S. PATENT DOCUMENTS

| | | | | |
|---|---|---|---|---|
| 4,475,761 A | * | 10/1984 | Milroy et al. ................. | 296/61 |
| 4,941,703 A | * | 7/1990 | Curry ........................ | 296/37.6 |
| 5,312,148 A | * | 5/1994 | Morgan ....................... | 296/61 |
| 5,380,144 A | * | 1/1995 | Smith et al. ................. | 414/537 |
| 5,676,515 A | * | 10/1997 | Haustein ..................... | 414/537 |
| 5,795,125 A | * | 8/1998 | Walkden ...................... | 414/537 |
| 5,803,523 A | * | 9/1998 | Clark et al. ................. | 296/26.1 |
| 5,897,285 A | * | 4/1999 | Wanderscheid et al. ..... | 414/537 |
| 6,076,215 A | * | 6/2000 | Blankenship et al. ........ | 14/71.1 |

* cited by examiner

Primary Examiner—Christopher P. Ellis
Assistant Examiner—Charles A. Fox
(74) Attorney, Agent, or Firm—Charles N. Quinn

(57) ABSTRACT

The present invention is a loading ramp assembly for loading objects onto a floor of a vehicle. The loading ramp assembly includes a multi-sectioned, foldable ramp capable of being stored in a compact enclosure located under the vehicle floor. The loading ramp assembly also includes a telescopic ramp supporting frame that alone slidably supports and retracts the ramp between an unfolded loading position, inclined from the rear of the vehicle floor to the ground, and a folded storage position within the compact underbody enclosure.

3 Claims, 6 Drawing Sheets

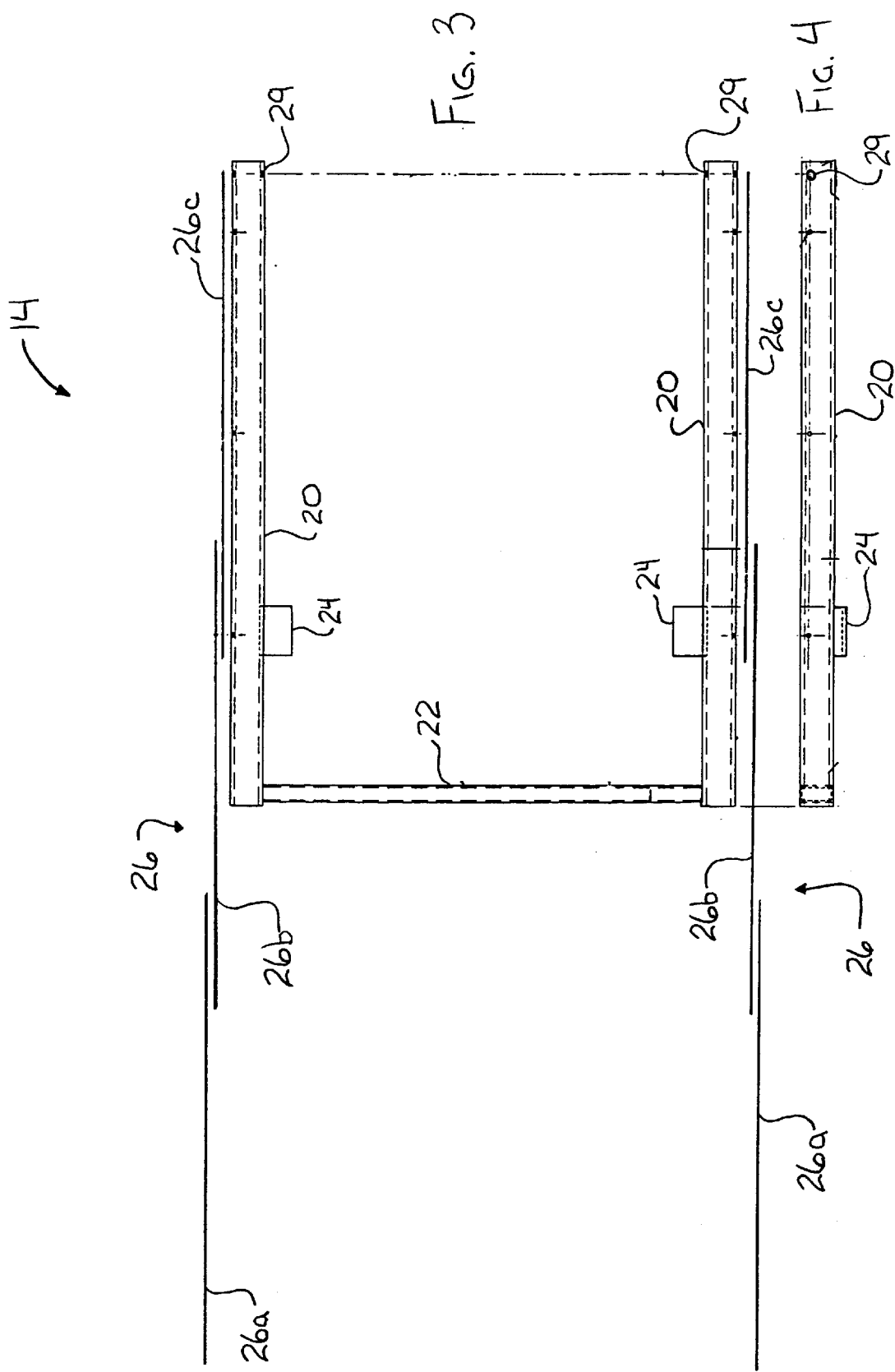

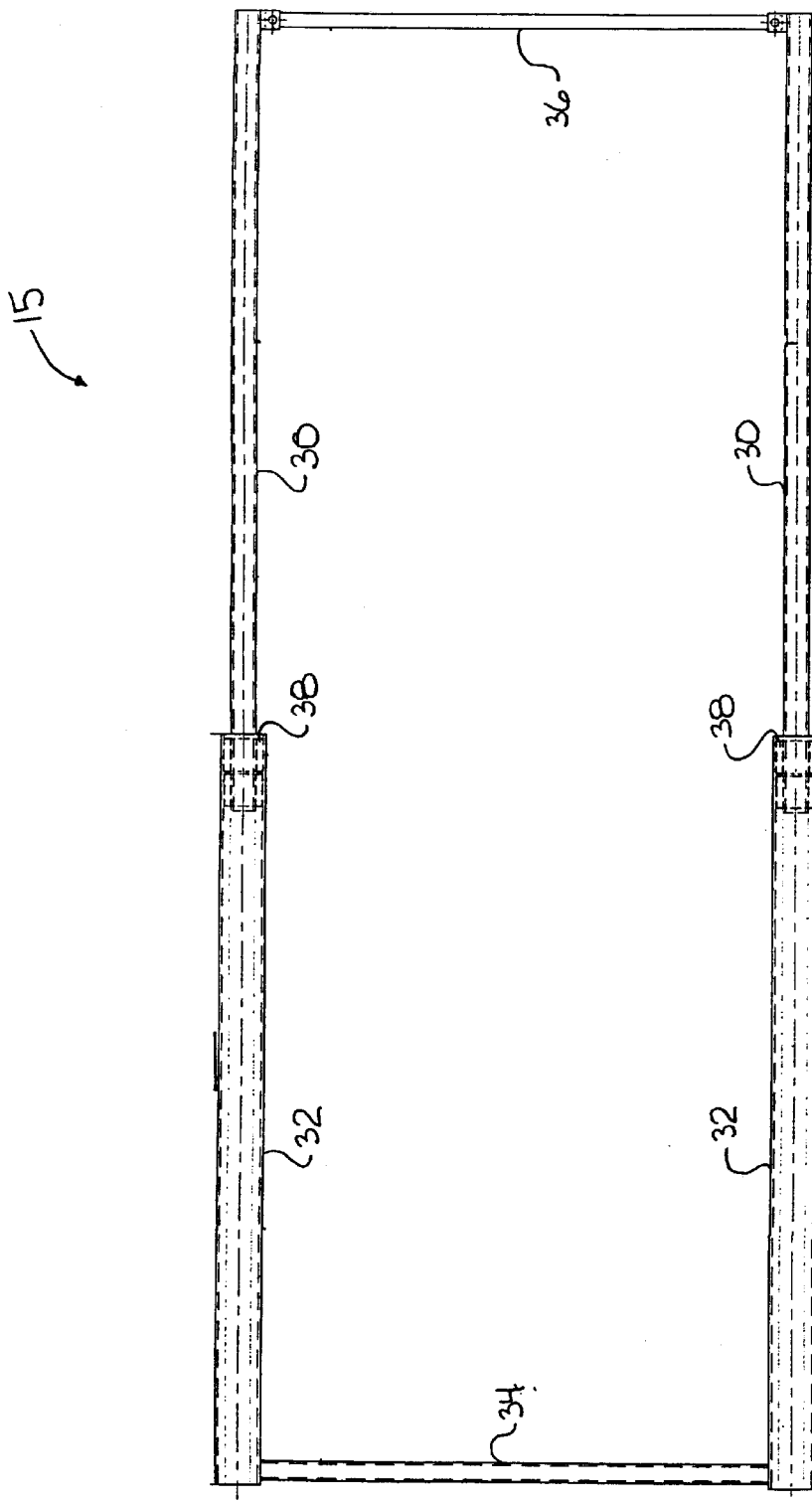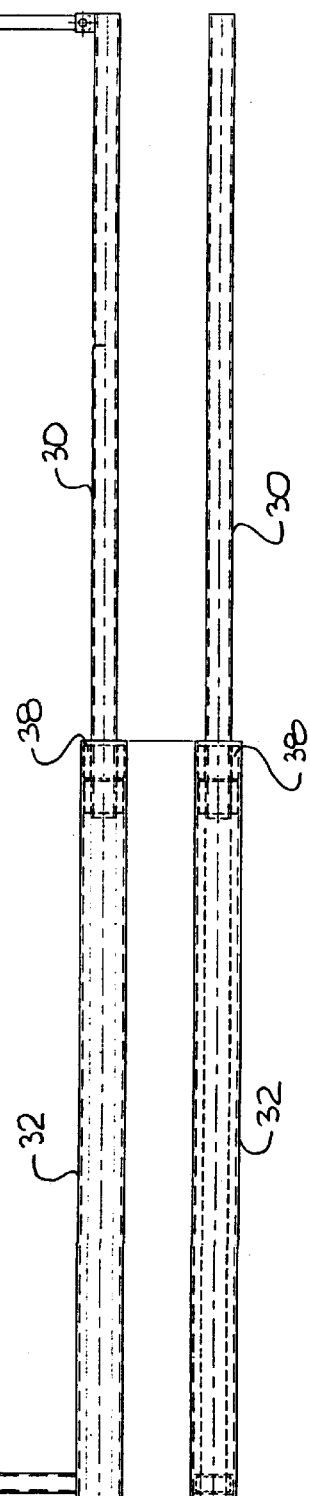
Fig. 5
Fig. 6

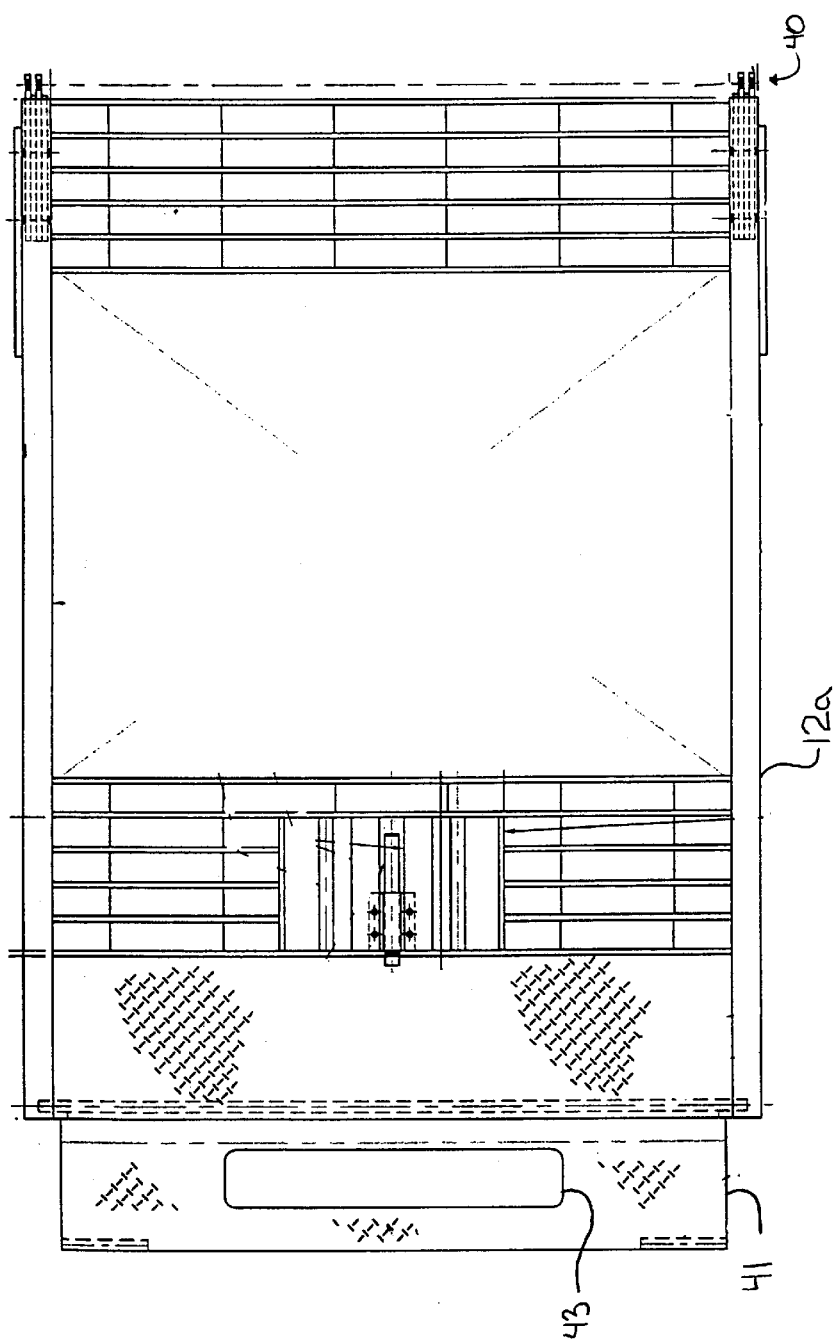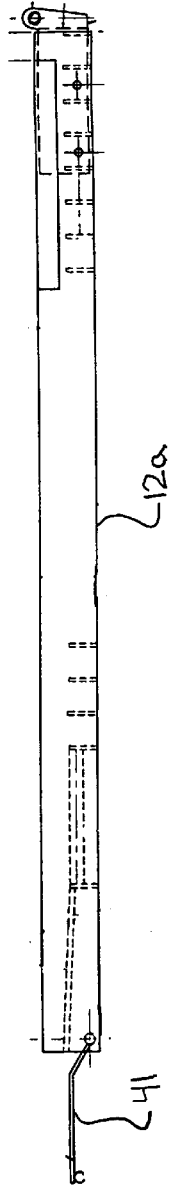

FOLDABLE RETRACTABLE LOADING RAMP ASSEMBLY

FIELD OF THE INVENTION

The present invention relates generally to a ramp assembly for loading objects onto a floor of a vehicle, and more particularly to a foldable retractable loading ramp stowable within a compact underbody enclosure.

BACKGROUND OF THE INVENTION

Loading ramp assemblies which are stowable beneath the floor of a vehicle are known. In many of these assemblies, the ramp is withdrawn from the rear of the truck, pivoted about a supporting frame, and attached to the rear of the cargo floor to provide an incline to the ground for the loading and unloading of objects from the vehicle.

Vehicle operators naturally prefer longer ramps to shorter ramps, as the longer ramps provide a more gradual incline to the ground. Providing cargo vehicles with longer ramps, and storing these ramps under the vehicle body, has been difficult and sometimes impossible. Short body trucks have been limited to a short ramp because of the limited space under the cargo area. However, even with large body cargo vehicles, providing the storage space for a long ramp below the cargo floor requires an expensive revision to the vehicle frame and differential, as well as the relocation of certain vehicle components such as the fuel tank.

The present invention solves these problems by providing a retractable ramp assembly with a foldable ramp, allowing for the storage of a long ramp in a confined area. Multiple ramp sections are folded and retracted into a compact underbody enclosure. The small size of the enclosure requires no revisions to the vehicle frame or differential, and does not interfere with underbody components. When removed and unfolded the ramp is long, providing a gradual incline to the ground for object loading and unloading.

In addition to the underbody limitations affecting the length of presently known ramp assemblies, maximizing the width of a loading ramp has also been a problem. Positioning a loading ramp assembly between the longitudinal framing members below the cargo floor limits ramp width. Presently, loading ramp assemblies include a ramp, a ramp supporting frame and a mechanism to slide the ramp and supporting frame out from under the cargo floor. These three components combine to severely limit the overall width of the ramp alone.

The present invention also solves this problem by providing a telescopic ramp supporting frame that alone slidably supports the ramp between a storage position within a compact underbody enclosure and a loading position providing a gradual incline from the rear of the cargo floor. Eliminating a separate sliding mechanism provides additional space between the longitudinal underbody framing members for a wider loading ramp.

SUMMARY OF THE INVENTION

The present invention is directed to a retractable loading ramp assembly having a foldable ramp, allowing for the storage of a long ramp within a compact underbody enclosure. This invention is also directed to a retractable loading ramp assembly having a telescopic ramp supporting frame that alone slidably supports the ramp between a storage position within a compact underbody enclosure and an inclined loading position from the rear of the cargo floor to the ground. The telescopic ramp supporting frame eliminates the need for a separate sliding mechanism, in addition to the ramp supporting frame, allowing for a wider loading ramp.

In one embodiment of the present invention, a telescopic ramp supporting frame is mounted below a floor of a vehicle. A ramp is connected to the frame and the frame slidably positions the ramp between the loading and storage positions. The ramp assembly may also include an enclosure mounted below the floor and the frame would be mounted within the interior of the enclosure. The frame may include two, three, four or more telescopic sections, where the telescopic sections provide the slidability for positioning the ramp between the loading and storage positions. The telescoping sections may include internal slide guides to maintain the alignment of the frame. The ramp may include two, three, four, or more foldable sections. The sections would be folded when the ramp is in the storage position and unfolded when the ramp is in the loading position. The ramp may include a sill plate, providing a smooth transition between the ramp and the floor of the cargo vehicle when the ramp is in the loading position. The sill plate may include a door latch access hole providing for the latching and securing of an overhead door when the ramp is in the loading position.

In a second embodiment of the present invention, the ramp assembly includes an enclosure mounted below the cargo floor of a vehicle, a slidable mechanism connected to the interior of the enclosure, a ramp supporting frame connected to the slidable mechanism, and a foldable ramp. The ramp may include two, three, four, or more foldable sections. The ramp is attached to the frame and the slidable mechanism positions the ramp and the frame between a loading position and a storage position. In the storage position, the ramp is folded and retracted into the enclosure. In the loading position, the ramp is removed from the enclosure, unfolded and inclined with one end on the ground and the other end attached to the rear of the cargo floor. The end of the ramp attached to the cargo floor includes a sill plate providing a smooth transition between the ramp and the floor of the vehicle. The sill plate includes a door latch access hole providing for the latching and securing of an overhead door while the ramp is in the loading position.

In a third embodiment of the invention, the ramp assembly includes an enclosure mounted below the floor, a telescopic ramp supporting frame connected to the interior of the enclosure, and a foldable ramp. The ramp may include two, three, four, or more foldable sections. The ramp is attached to the frame and the frame telescopically positions the ramp between the loading and storage positions. The ramp supporting frame may include two, three, four, or more telescoping sections. The end of the ramp connected to the rear of the cargo floor may include a sill plate, which may include a door latch access hole.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 illustrates a plan view of a ramp supporting frame with a slidable mechanism, included as part of the ramp assembly shown in FIG. 2;

FIG. 4 illustrates an elevation view of the ramp supporting frame of FIG. 3;

FIG. 5 illustrates a plan view of a telescopic ramp supporting frame having two sections, included as part of a foldable retractable ramp assembly according to further embodiment of the present invention;

FIG. 6 illustrates an elevation view of the telescopic ramp supporting frame of FIG. 5;

FIG. 10 illustrates a plan view of a truck-end ramp section having a sill plate according to further embodiment of the present invention;

FIG. 11 illustrates an elevation view of the truck-end ramp section of FIG. 10;

DETAILED DESCRIPTION OF THE INVENTION

Figure 1:
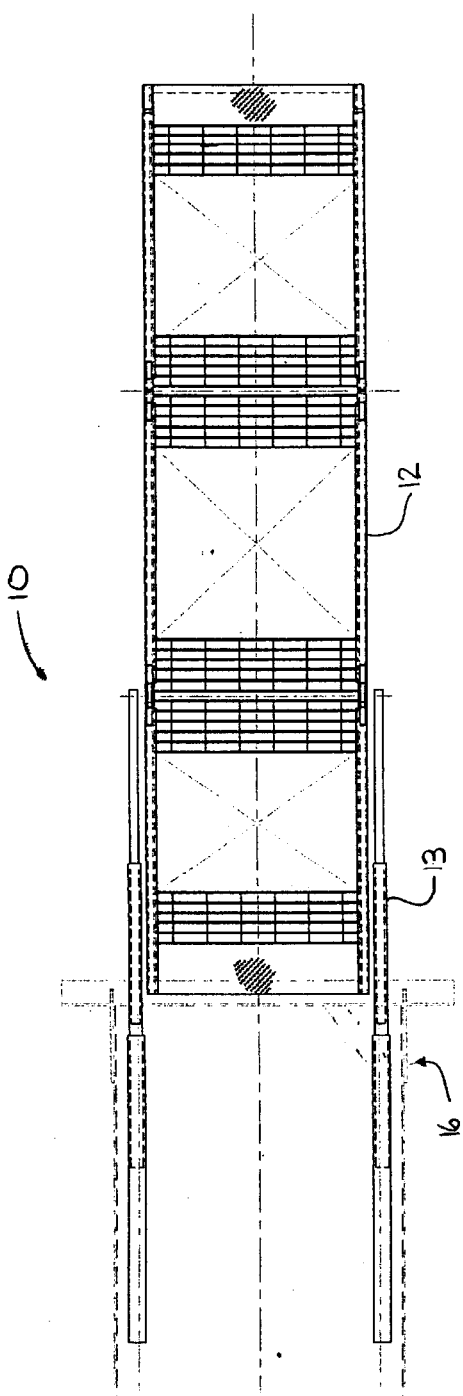
FIG. 1 illustrates a plan view of a foldable retractable ramp assembly according to one embodiment of the present invention.

Referring now to the drawings, wherein like numerals indicate alike elements, there is shown in FIG. 1 an illustration of a plan view of a foldable retractable loading ramp assembly 10. The loading ramp assembly 10 includes a ramp 12 having three sections and a three-part telescopic ramp supporting frame 13 connected to a truck 16. The telescopic ramp supporting frame 13 telescopically positions the ramp 12 between a storage position and a loading position. Variations of the embodiment of FIG. 1 could include a two, four or more section ramp, or a two, four or more section telescopic ramp supporting frame.

Figure 2:
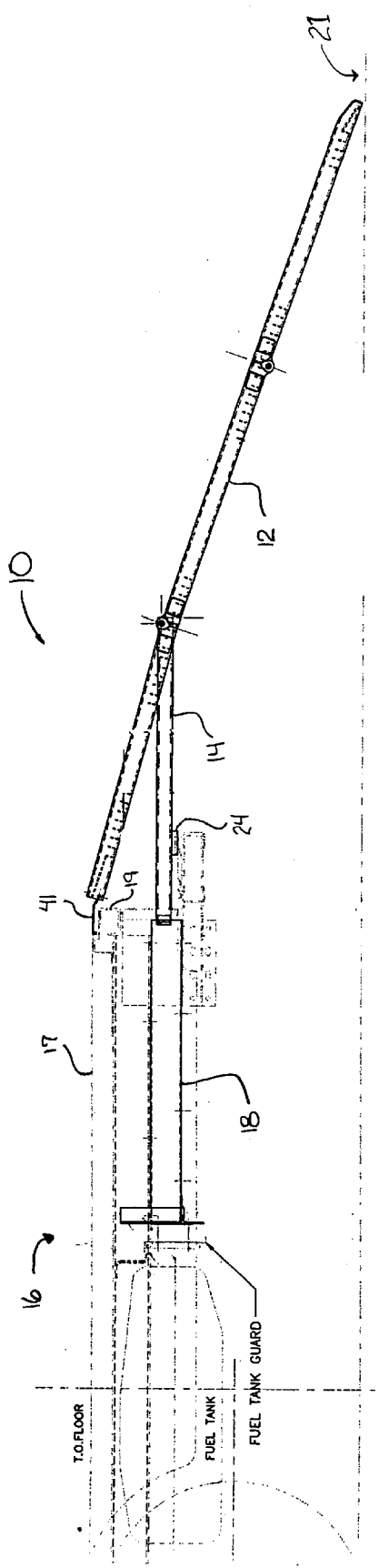
FIG. 2 illustrates an elevation view of a foldable retractable ramp assembly according to another embodiment of the present invention.

FIG. 2 is an elevation view of a foldable retractable loading ramp assembly 10 having a three-section ramp 12, a ramp supporting frame 14, and an enclosure 18 mounted below the cargo floor 17 of a truck 16. The ramp supporting frame 14 (not telescopic) is connected to a sliding mechanism (not shown) which provides the slidable positioning of the frame 14 and the ramp 12 between a stowable position within the enclosure 18 and a loading position as shown in FIG. 2. In the loading position, the ramp 12 is unfolded and extended on an incline from the rear of the cargo floor 17 to the ground. At the top of the ramp 12 a sill plate 41 provides a smooth transition between the ramp 12 and the cargo floor 17. Variations of the embodiment of FIG. 2 could include a two, four or more section ramp, or a multi-sectioned telescopic ramp supporting frame.

FIG. 3 is a plan view and FIG. 4 is an elevation view of the ramp supporting frame 14. FIG. 3 also illustrates a slidable mechanism 26, such as a drawer slide type device, which slidably positions the frame 14 and the ramp 12 between the storage and loading positions. The ramp supporting frame 14 includes two parallel supporting members 20 connected by a cross-member 22. Each supporting member 20 includes one bumper mount 24 which supports the ramp assembly on a bumper of the truck 16 when the ramp 12 is in the loading position (as shown in FIG. 2). An attachment hole 29 is located at the ramp 12 end of each supporting member 20, for pivotal connection with the ramp 12.

The slide mechanism 26 includes an outer slide section 26a, a middle slide section 26b and an inner slide section 26c. The sections 26a, 26b and 26c slidably interlock to position the ramp 12 between the loading and storage positions. The inner slide section 26c is connected to a respective supporting member 20. The outer slide sections 26a are connected to the interior of the enclosure 18 or to an underbody framing member of the truck 16 if no enclosure 18 is present.

FIG. 5 is a plan view and FIG. 6 is an elevation view of a two-part telescopic ramp supporting frame 15. The two-part telescopic frame 15 includes two parallel outer support members 32 and two parallel inner support members 30. The two inner support members 30 and the two outer support members 32 communicate telescopically, with the inner support member 30 fitting within the outer support member 32. The outer support members 32 are connected and braced to each other by a fixed cross member 34. The inner support members 30 are connected and braced to each other by an alignment cross member 36. Internal slide guides 38 may exist within each of the outer support members 32 to facilitate the telescopically sliding communication between the inner support members 30 and the outer support members 32.

The two-part telescopic ramp supporting frame 15 could be implemented in the loading ramp assembly 10 of FIGS. 1 or 2, replacing the three-part telescopic ramp supporting frame 13 shown in FIG. 1 or the ramp supporting frame 14 shown in FIG. 2.

Figure 8:
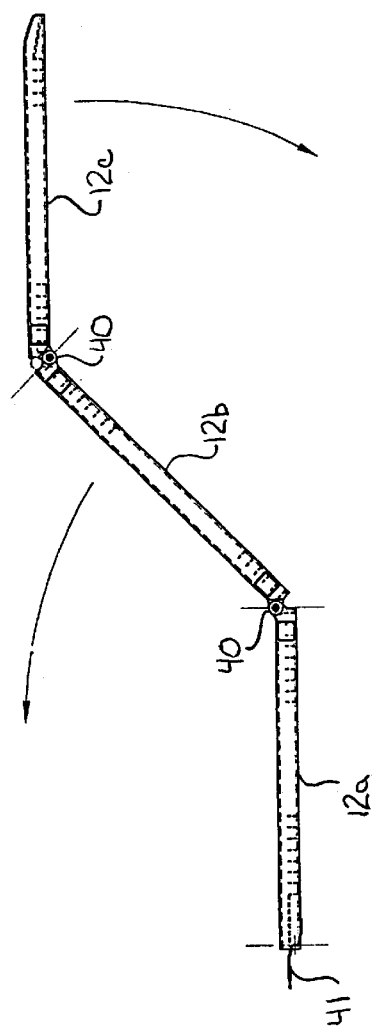
FIG. 8 illustrates an elevation view of the folding of the three-section ramp of FIG. 7.
Figure 7:
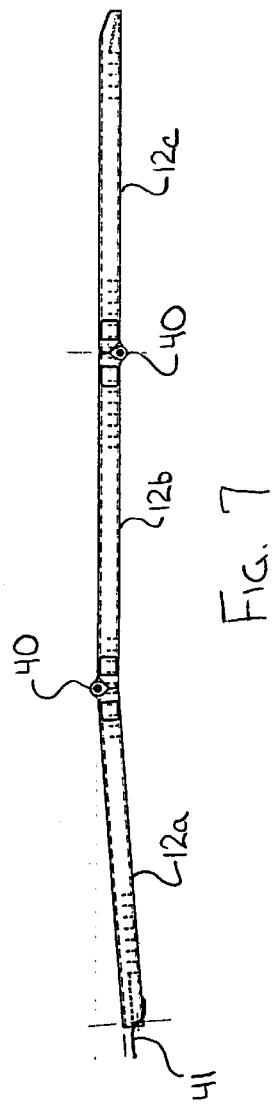
FIG. 7 illustrates an elevation view of an unfolded and extended three-section ramp according to another embodiment of the present invention.
Figure 9:
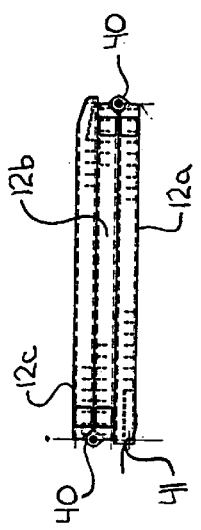
FIG. 9 illustrates an elevation view of the completely folded three-section ramp of FIG. 7.

FIGS. 7, 8 and 9 illustrate the three-section ramp 12 in various foldable positions. FIG. 7 shows the ramp 12 in an unfolded, loading position. The three-section ramp 12 includes a truck-end ramp section 12a, a middle ramp section 12b, and a ground ramp section 12c. At one end of the truck-end ramp section 12a, a sill plate 41 exists for attachment to the cargo floor 17 of the truck 16. Connecting each of the three ramp sections 12a, 12b, and 12c, a hinge 40 exists to facilitate the folding of the ramp 12.

FIG. 8 illustrates the three-section ramp 12 being folded from an extended loading position (FIG. 7) to a folded, storage position (FIG. 9). The arrows of FIG. 8 demonstrate the direction in which the middle ramp section 12b and the ground ramp section 12c are hinged and folded in relation to the truck-end ramp section 12a to attain the completely folded ramp position of FIG. 9. FIG. 9 illustrates the three-section ramp 12 in its folded storage position. It is in this folded position that the ramp 12 is retracted for storage, while supported on one of the three described ramp supporting frames (13, 14, or 15), into the enclosure 18 under the cargo floor 17 of the truck 16.

FIG. 10 is a plan view and FIG. 11 is an elevation view of the truck-end ramp section 12a. The truck-end ramp section 12a includes a sill plate 41 with a door latch access hole 43. In the ramp 12 loading position, the sill plate 41 extends from the truck-end ramp section 12a into a contoured sill 19 of the cargo floor 17, providing a smooth transition between the ramp 12 and the cargo floor 17. The door latch access hole 43 allows the truck operator to close and secure an overhead cargo door of the truck 16 while the ramp 12 is in the loading position.

Figure 12:
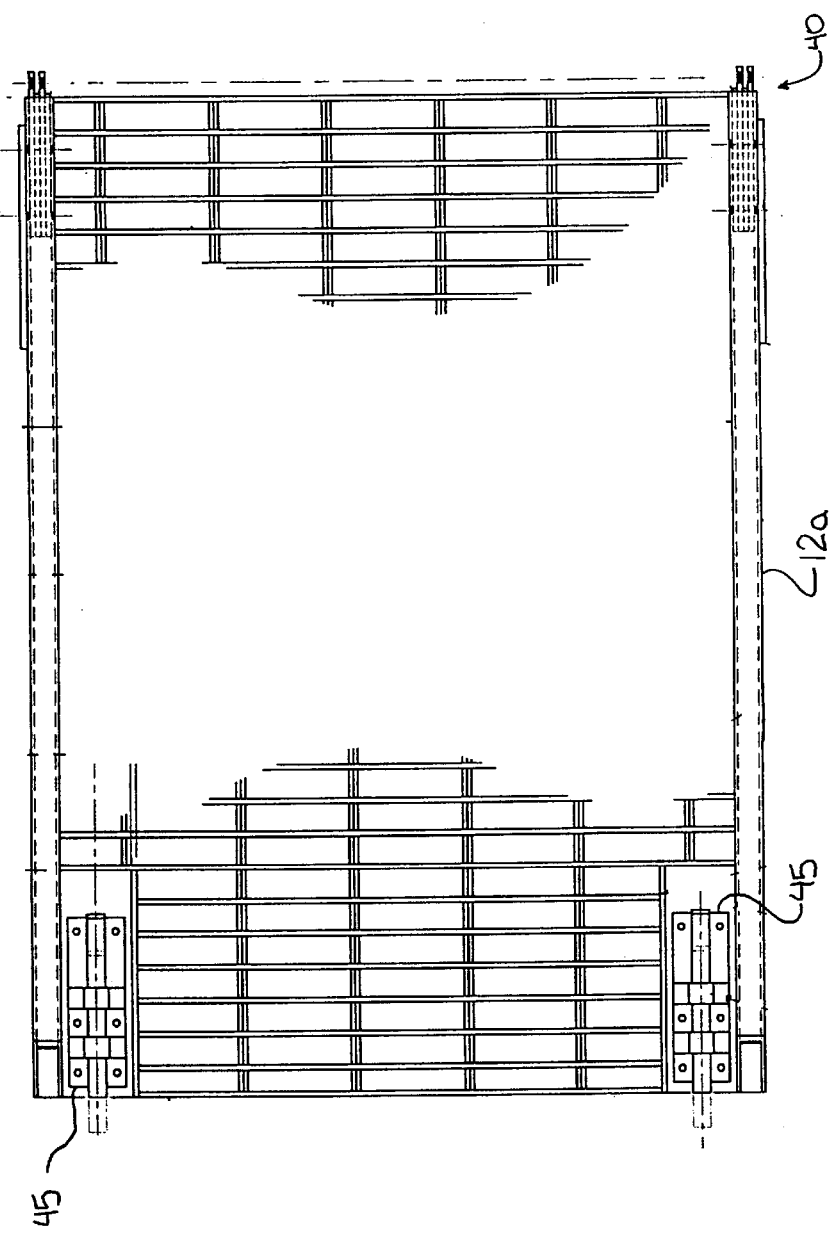
FIG. 12 illustrates a plan view of a truck-end ramp section having a slide-bolt assembly according to a still further embodiment of the present invention.
Figure 13:
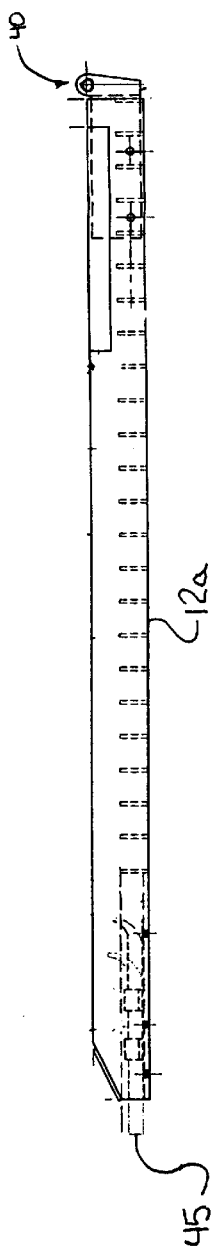
FIG. 13 illustrates an elevation view of the truck-end ramp section of FIG. 12.

FIG. 12 is a plan view and FIG. 13 is an elevation view of an alternative embodiment of the truck-end ramp section 12a. The truck-end ramp section 12a includes two slide bolt assemblies 45. In the loading position, the bolt of each slide bolt assembly 45 aligns with a hole in the sill 19 of the cargo floor 17 to secure the ramp 12 to the cargo floor 17.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A ramp assembly for loading objects onto a floor of a vehicle comprising:
   a ramp supporting frame mounted below the floor; and
   a ramp connected to the frame, the frame slidably positioning the ramp between a loading position and a storage position, including an enclosure mounted below the floor, wherein the frame is mounted to the interior of the enclosure;
   wherein the frame includes telescoping sections providing the slidable positioning of the ramp and including at least two internal slide guides;
   including at least three foldable sections, being folded when the ramp is in the storage position and unfolded when the ramp is in the loading position, including a sill plate including a door latch access hold providing for latching and securing a vehicle overhead door while the ramp is in the loading position.

2. A ramp assembly for loading objects onto a floor of a vehicle, comprising:
   an enclosure mounted below the floor;
   a slidable mechanism connected to the interior of the enclosure;
   a ramp supporting frame connected to the slidable mechanism;
   a foldable ramp including three sections, the ramp being attached to the frame, the slidable mechanism positioning the frame and retracted into the enclosure when in the storage position and removed, unfolded and inclined in the loading position;
   wherein the ramp includes a sill plate wherein the sill plate includes a door latch access hole providing for latching and securing of a vehicle overhead door while the ramp is in the loading position.

3. A ramp assembly for loading objects onto a floor of a vehicle, comprising:
   an enclosure mounted below the floor;
   a telescoping ramp supporting frame connected to the interior of the enclosure;
   a foldable ramp including three sections, the ramp attached to the frame, the frame telescopically positioning the ramp between a loading position and a storage position, the ramp being folded and retracted into the enclosure when in the storage position and removed, unfolded and included in the loading position, including at least two telescoping sections;
   wherein the sill plate includes a door latch access hold providing for latching and securing of a vehicle overhead door while the ramp is in the loading position.

* * * * *